Figure 1:
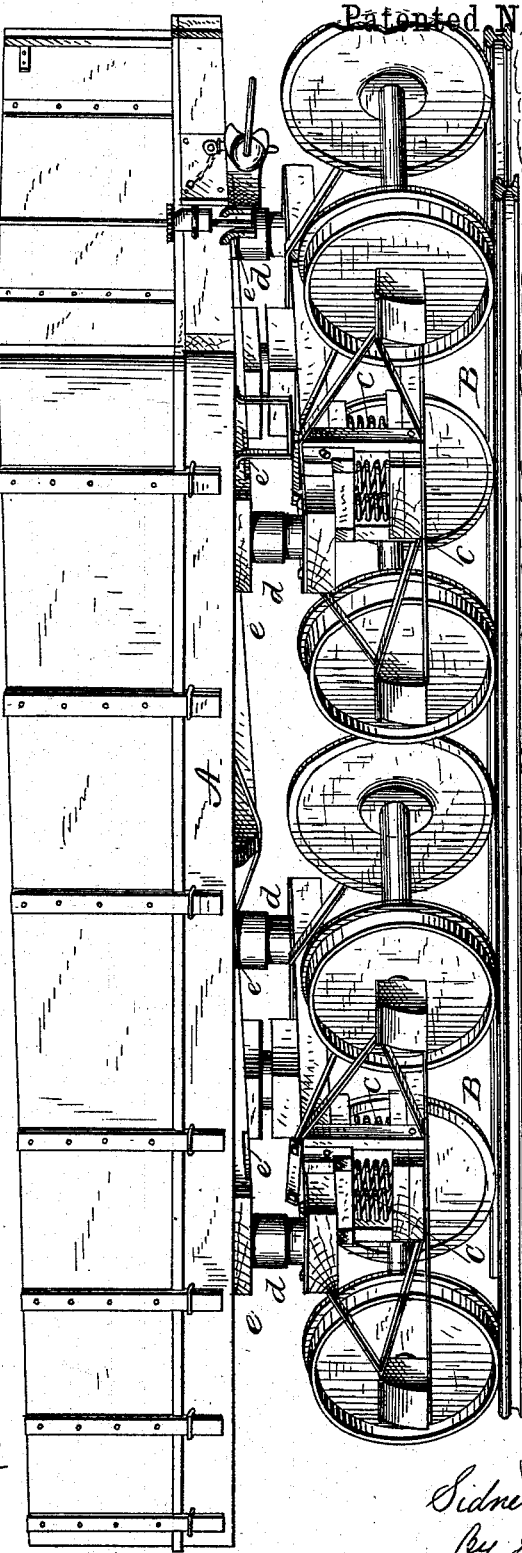

(No Model.) 2 Sheets—Sheet 2.

S. D. KING.
RAILWAY CAR.

No. 249,370. Patented Nov. 8, 1881.

Witnesses.
F. L. Ourand
A. M. Ridenour

Inventor.
Sidney D. King,
By his Atty.
G. N. Thompson

UNITED STATES PATENT OFFICE.

SIDNEY D. KING, OF PITTSTON, PENNSYLVANIA.

RAILWAY-CAR.

SPECIFICATION forming part of Letters Patent No. 249,370, dated November 8, 1881.

Application filed July 14, 1881. (No model.) Patented in Canada December 7, 1880.

*To all whom it may concern:*

Be it known that I, SIDNEY D. KING, a citizen of the United States, residing at Pittston, in the county of Luzerne and State of Pennsylvania, have invented certain new and useful Improvements in Cars, (for a part of which I have obtained a patent in Canada, No. 12,093, bearing date December 7, 1880,) of which the following is a specification.

My invention relates to that class of railway-cars having swiveling trucks and their carrying-springs between parts of the truck.

It consists, first, in the combination and arrangement, with such a truck and a car-body, of balancing-springs, one or more of which are arranged upon each side of each car-truck and between the upper part of the same and the lower part of the car-body, upon which the body bears but slightly or not at all, except when the car is passing over uneven tracks or around curves; and, second, it consists in the combination, with each of said springs, of a friction-bearing, to permit the car-body to swivel or turn upon the truck in passing curves, and at the same time to provide a yielding bearing, so as to lessen the friction on the same.

Heretofore in cars of this class the usual springs (which are located between parts of the truck) upon which the car-body and its load are supported have been depended upon also to provide for the necessary oscillation that is required to accommodate the wheels to curves and uneven tracks. The objections to depending alone upon the carrying-springs for the required oscillation are that they are in such cases necessarily made twice as strong as would be required were the tracks at all places true and level; hence the said springs are so rigid that when the wheel or wheels upon one side of either truck strike an uneven track the weight of the car-body and its load, instead of remaining supported upon the center of each truck, from which the weight would be evenly distributed to each of the springs, journals, wheels, &c., of the trucks, shifts to two other points of support, one of which is upon one side of one of the trucks and the other diagonally across the car to the other side of the other truck, so that each of the several parts of but one side of either truck is in such cases required to carry nearly twice the load for which it is designed; or if it has been designed and proportioned to have parts thus doubly loaded on curves and uneven tracks, then the increased cost of materials, the greater dead weight to be hauled, and the heavier draft and wear and tear from the unequal loading are serious objections; and, further, the wheels upon the other sides of the trucks that are relieved from weight are much more liable to leave the track, and the car-body is strained and injured by being thus carried.

The object of my invention is to keep the car-body supported upon the center of each truck, not only while passing over level and straight tracks, but also when on curves and uneven tracks, thus keeping the weight of the car-body and its load at all times properly distributed upon each of the several carrying-springs, journals, wheels, &c., which form the truck, which greatly reduces the general wear and tear of the car; and, further, if at any time the car is so greatly overloaded as to force the carrying-springs together, as sometimes happens through accident or mistake, considerable relief will be afforded to the car independently of the features or other benefits arising from my invention as above stated. My said balancing-springs are made to take the place of the usual friction-bearings between the truck and the car-body, except that I generally prefer to place them farther out from the center of the truck, near the end of the truck-beam, close to the side of the car-body. Their office is to keep the car-body at all times balanced upon its bearings upon the centers of its trucks, and at the same time to afford a yielding friction-bearing for the body to slide upon in turning.

Figure 2:
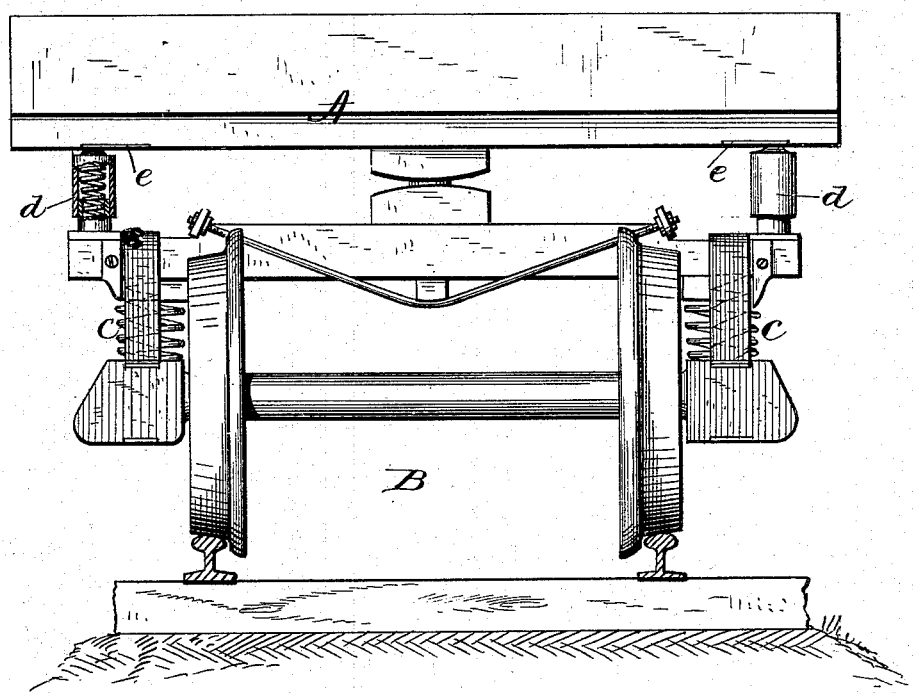

In the accompanying drawings, in which similar letters of reference indicate like parts, Figure 1 is a side view, and Fig. 2 is an end view, of a car illustrating the peculiar combination and arrangement of the balancing-springs and their friction-bearings with the swiveling trucks and car-body, which constitute my invention.

A represents a car-body, which may be flat, gondola, box, or of any desired form or construction.

B B are swiveling trucks, having the ordinary springs *c c* between parts of the truck.

Between the top of the truck and the bottom of the car-body are shown the balancing-springs $d$ and the friction-bearing $e$, whose functions have been fully described.

While the best results will be obtained by placing my balancing-springs well out to the ends of the truck-beams and side sills of the car, good results may be obtained by locating them nearer the center; hence I do not restrict my invention to the exact location of these springs as shown in the drawings, as the principle of the invention may be carried out more or less perfectly by locating said springs and their friction-bearings at a greater or less distance from the center of the truck, and anywhere between the top of the same and the bottom of the car-body.

My invention can be applied to many old cars by simply removing the rigid friction-irons and substituting the springs and friction-bearings. To adapt it to some old cars, however, it will be necessary to raise the center-bearing in order to make room for the supplementary springs, which, however, do not require very much room, as they need have much less power than the carrying-springs.

I do not restrict my invention to the forms of car-body, trucks, or balancing-springs shown, as it is obvious many other forms may be used.

I am aware that it is not new to have carrying-springs arranged between a car-truck and a car-body; that such springs, consisting of india-rubber balls, have been arranged to roll in concave plates, and thus serve as friction-rollers; also, that elliptic carrying-springs, attached to both the car-truck and the car-body, have been arranged to sway upon a link-connection for the purpose of permitting the car-truck to turn or swivel under the car-body; also, that various devices have been employed that would produce a friction-bearing somewhat yielding; but in each case the arrangement has been such as to throw the whole or so large a part of the weight of the car-body and its load upon said friction-bearings as to illustrate the demand for the invention embraced in this application, and I know of no anticipation of the combination and arrangement of springs, as herein described and claimed, applied to a car in which the car-body rests upon rigid bearings upon the centers of its trucks, and whose function is to cause a free oscillating and swiveling movement between the body and the truck, for the purpose of keeping the former constantly supported on the centers of its trucks, and thus at all times keeping the weight nearly equally distributed to the several carrying-springs and other parts of the truck, the balancing-springs being so lightly loaded as compared to the carrying-springs as to permit of the free swiveling movement of the car-body upon said balancing-springs, as herein described.

I claim—

1. In a car having swiveling trucks, its carrying-springs between parts of the truck, and its body supported upon rigid bearings upon the centers of its trucks, the combination of the car-truck, the car-body, and balancing-springs arranged between and attached to one of them, and having a friction-bearing upon the other, substantially as set forth.

2. In a car having swiveling trucks, its carrying-springs between parts of the truck, and its body supported upon rigid bearings upon the centers of its trucks, the combination of the car-truck, the car-body, and balancing-springs, which serve also as yielding friction-bearings, arranged between and attached to one of them and having bearings upon the other, substantially as described.

SIDNEY D. KING.

Witnesses:
G. B. THOMPSON,
SOLOMON LEON.